United States Patent [19]
Jones et al.

[11] 3,975,306
[45] Aug. 17, 1976

[54] METHOD FOR IMPROVING THE PHOTO-INDUCED DISCHARGE CHARACTERISTICS OF CERTAIN CADMIUM CHALCOGENIDES

[75] Inventors: Robert N. Jones, Fairport, N.Y.; David J. Swarthout, Arlington, Mass.

[73] Assignee: Xerox Corporation, Stamford, Conn.

[22] Filed: Oct. 30, 1974

[21] Appl. No.: 519,162

[52] U.S. Cl. ................................. 252/501; 96/1.5; 423/508; 423/509
[51] Int. Cl.² ............................................. G03C 1/00
[58] Field of Search ...................... 252/501; 96/1.5; 106/301; 423/508, 509, 561, 562

[56] References Cited
UNITED STATES PATENTS

| | | |
|---|---|---|
| 2,134,055 | 10/1938 | Meister .......................... 106/301 X |
| 2,643,196 | 6/1953 | Allan et al. ........................ 106/301 |
| 3,738,831 | 6/1973 | Gunther ............................ 252/501 X |
| 3,787,208 | 1/1974 | Jones .............................. 252/501 X |
| 3,867,139 | 2/1975 | Yamada et al. .................. 252/501 X |

*Primary Examiner*—Benjamin R. Padgett
*Assistant Examiner*—E. Suzanne Parr
*Attorney, Agent, or Firm*—James J. Ralabate; James P. O'Sullivan; Jerome L. Jeffers

[57] ABSTRACT

Disclosed is a method for improving the photo-induced discharge characteristics of certain cadmium chalcogenides selected from the group of CdS, CdTe, CdAs, CdSe and CdSSe. The method involves calcining a mixture of the cadmium chalcogenide or a precurser thereof in the presence of cadmium oxide or a compound which decomposes upon heating to cadmium oxide in an amount sufficient to provide an excess of unreacted cadmium oxide after calcination.

19 Claims, 4 Drawing Figures

METHOD FOR IMPROVING THE PHOTO-INDUCED DISCHARGE CHARACTERISTICS OF CERTAIN CADMIUM CHALCOGENIDES

BACKGROUND OF THE INVENTION

This invention relates to xerography and more specifically to an improved photosensitive material for use in binder layer xerographic photoreceptors.

The art of xerography involves the use of a photoconductive element or plate which is uniformly electrostatically charged in order to sensitize its surface. The plate is then exposed in an imagewise manner to activating electromagnetic radiation which selectively dissipates the charge in the exposed areas of the photoconductive material while leaving behind a latent electrostatic image in the non-exposed areas. This latent electrostatic image may then be developed by depositing a finely divided, electroscopic marking material on the surface of the photoconductive material. This concept was originally disclosed by Carlson in U.S. Pat. No. 2,297,691 and is further amplified and described in many related patents.

One type of photoconductive layer used in xerography is described in U.S. Pat. No. 3,121,006 to Middleton and Reynolds which describes a number of binder layers comprising finely divided particles of a photoconductive inorganic compound dispersed in an organic, electrically insulating resin binder.

In the particular examples of the binder systems described in Middleton et al, the dispersion of photoconductive particles is relatively uniform, such uniformity having been accomplished by thorough mixing of the resin and photoconductive particles. With these uniform dispersions a relatively high volume concentration of photoconductive particles, usually about 50 percent by volume, is used to obtain the requisite particle-to-particle contact necessary for rapid discharge. This type of binder layer is quite useful for non-reusable systems where the photoreceptor is applied to the paper, but does not have the necessary physical properties to be useful in high speed cyclic imaging.

It has been discovered more recently that the optimum volume concentration of photoconductive material can be reduced significantly, i.e. to a level of from 1 to 25 volume percent, without sacrificing photosensitivity by controlling the bulk geometry of the photoconductive binder layer to insure particle-to-particle contact of the photoconductive particles throughout the thickness of the binder layer. This reduction in concentration of the photoconductive particles results in enhanced mechanical and surface properties as well as improved control of the electrical characteristics of the binder layer. This concept, which is more fully described by R. N. Jones in U.S. Pat. No. 3,787,208, uses binder materials in particulate form which have been classified to achieve a restricted particle size and particle size distribution. A mixture of these particles in the proper proportion may then be dispersed in a suitable carrier media in which neither constituent is soluble. A continuous film may then be formed from this suspension, dried, and the binder particles fused together. The critical step is not the application procedure but the photoreceptor geometry control achieved by employing a particulate binder and a particulate photoconductive material having the correct size and size distribution. The photoconductive material is preferably of sub-micron size to achieve the desired configuration. By effective application of this controlled size particulate binder concept, it is possible to utilize a wide choice of binder materials in order to achieve the desired physical properties.

There is an ongoing need for improved photoconductive materials for use in the above-described binder layer photo-receptors. In the synthesis of group II chalcogenides for employment in binder layer photoreceptors it is possible to employ well-known doping techniques to achieve photosensitivity much greater than that of zinc oxide. These preparation methods require the incorporation into the lattice of small quantities of elements such as copper, chlorine, gallium, aluminum, etc., which is normally accomplished by multiple firing of the materials in the presence of a fluxing mineralizing agent. Resistive, highly sensitive photoconductors have been prepared in this manner, however, this method inherently leads to a relatively large particle size, 1–30 $\mu$, which places severe limitations on the use of these materials in fabricating electrostatographic photoreceptors. This is especially true in terms of the resultant high background density and limited mechanical properties encountered with layers having a high volume loading of photo-conductor, and poor sensitivity in geometry controlled matrix layers where the volume concentration of the photoconductor phase is reduced.

It is well known that cadmium chalcogenides, e.g. CdS, CdTe, CdAs, CdSe and CdSSe, manufactured as pigments are photosensitive and can be utilized in the fabrication of xerographic layers. These materials possess an advantage in that they can be prepared in a particle size which ranges from 0.001 to 1 $\mu$ and are, therefore, eminently more suited to the formulation of xerographic photoreceptors than presently available doped materials. Two major problems have restricted the use of these materials in the past. They are: (1) a comparatively low order of sensitivity as compared to the doped materials and (2) the inability to consistently produce a material having the same electrical characteristics by presently known processes.

Sodium sulfide solutions have been used extensively for many years in the production of cadmium sulfide by reacting the sulfide solution with a soluble cadmium salt to bring about the precipitation of the cadmium in the form of its sulfide. Similarly, other cadmium chalcogenides such as the telluride, arsenide and selenide can be prepared. Calcination of the precipitate results in the formation of a photoconductive material. In the process of the instant invention, finely divided CdO or a material which is thermally degradable to CdO, i.e. oxidic cadmium, is added to the precipitate before calcination.

Cadmium sulfoselenide, sometimes referred to as cadmium red pigment, can be prepared by mixing cadmium sulfide, cadmium oxide and selenium in finely divided form and calcining the mixture at an elevated temperature to form the desired product. Such a process is disclosed in U.S. Pat. No. 2,134,055 wherein it is stated that the presence of cadmium oxide during calcination is advantageous because it reduces or eliminates losses of selenium. The patentee goes on to state that "it is often desirable to use somewhat less cadmium oxide than the specified molecular proportions in order to avoid the possibility of any unreacted cadmium oxide in the final product."

The foregoing patent stresses the desirability of using less than a stoichiometric amount of selenium and CdO or an oxidic cadmium compound. This is understandable since the patentee was interested in the preparation of CdSSe for use as a pigment and the presence of unreacted CdO in the product would be undesirable.

Preparation of CdSSe by the calcination of a material containing cadmium sulfide, selenium and cadmium oxide or an oxidic cadmium compound will in some instances provide a product having a particle size in the sub-micron range desired for use in binder layer photoreceptors. However, it has been discovered that CdSSe prepared by prior art methods is not particularly suitable for use in binder layer photoreceptors especially those of the controlled geometry type in which the volume concentration of photoconductor is relatively low for the reasons previously set out.

It would be desirable and it is an object of the present invention to provide a method for improving the photo-induced discharge characteristics of certain cadmium chalcogenides.

An additional object is to provide a novel process for the preparation of cadmium sulfoselenide which exhibits improved photo-induced discharge characteristics.

It is a further object to provide such a process in which the cadmium sulfoselenide is prepared by the calcination of cadmium sulfide, cadmium oxide and selenium in finely divided form.

An additional object is to provide such a process which produces a CdSSe pigment suitable for use in binder layer electrostatographic photoreceptors.

Another object is to provide such a process which produces a CdSSe pigment suitable for use in geometry controlled binder layer photoreceptors.

SUMMARY OF THE INVENTION

The present invention is a method for improving the photo-induced discharge characteristics of certain cadmium chalcogenides selected from the group of CdS, CdTe, CdSe, CdAs and CdSSe. The method comprises calcining a mixture of the cadmium chalcogenide or a precurser thereof in the presence of cadmium oxide or a compound which decomposes upon heating to cadmium oxide in an amount sufficient to provide an excess of unreacted cadmium oxide after calcination.

DETAILED DESCRIPTION AND PREFERRED EMBODIMENTS

Figure 1:
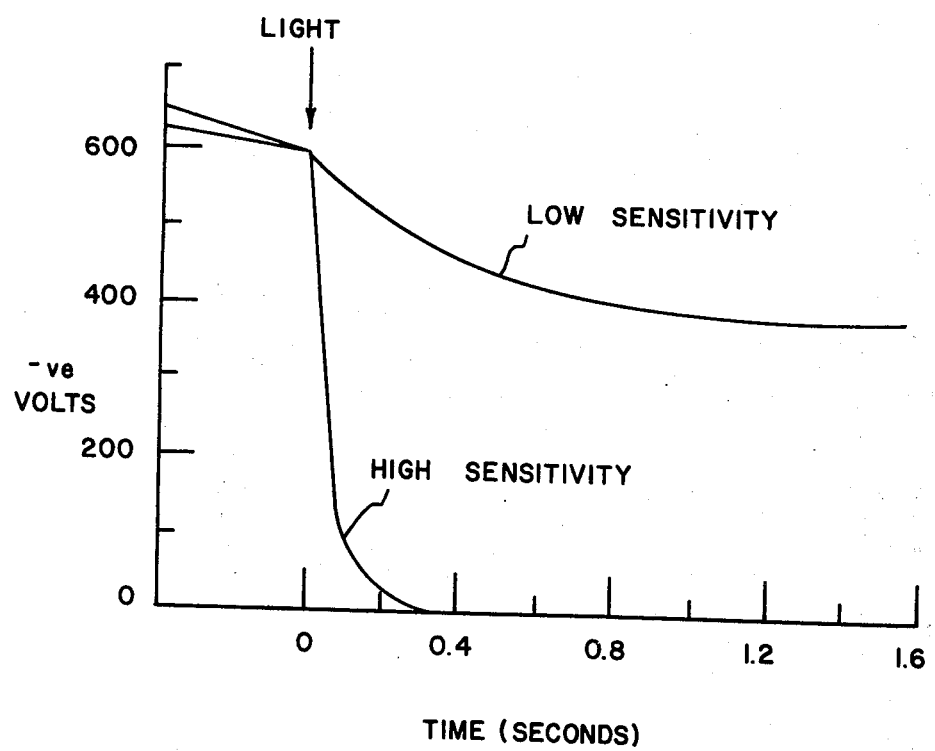
FIG. 1 is an idealized curve of PIDC for photoconductive materials of high and low sensitivity.

In general, the cadmium chalcogenide is prepared by combining in aqueous solution a cadmium salt and a soluble salt containing the chalcogenide as anion to form the insoluble cadmium chalcogenide which precipitates from the solution. The precipitate is washed to remove soluble impurities and dried to form a raw cake. At this point, particulate CdO or an oxidic cadmium compound is combined with the raw cake and this mixture is calcined, typically at a temperature of from 300° to 700°C. and preferably at a temperature of from 450° to 550°C., to form the desired product. As is illustrated by Example I which follows, a photoconductive material can be prepared by the calcination of the reaction product formed between sodium sulfide and cadmium carbonate. It can further be determined from the example that the addition of $CdCO_3$ before calcination, in an amount sufficient to provide an excess of unreacted CdO after calcination, results in a significant improvement in the electrical performance of the cadmium sulfide. The photo-induced discharge characteristics of CdTe, CdAs, CdSe and CdSSe are improved in a similar manner.

In a preferred embodiment, cadmium sulfoselenide having improved photo-discharge characteristics is prepared by calcining a mixture of finely divided cadmium sulfide, cadmium oxide and selenium to form the desired product while employing an amount of cadmium oxide or a compound which decomposes upon heating to cadmium oxide sufficient to provide an excess of unreacted cadmium oxide after calcination.

In general, the cadmium sulfoselenide pigment is prepared by dissolving selenium in an alkali metal or barium sulfide solution and then reacting the selenium containing solution with a cadmium salt to form a crude product referred to herein as the raw cake. The raw cake is normally washed and dried and then calcined under non-oxidizing conditions during which the cadmium, sulfur and selenium are induced to unite into a pigmentary product.

An example of such a preparation in which the cadmium salt is cadmium sulfate and the alkali metal sulfide is sodium sulfide is represented by the following equation:

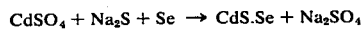

$$CdSO_4 + Na_2S + Se \rightarrow CdS.Se + Na_2SO_4$$

Washing the reaction products with water removes the soluble species, i.e. $Na_2SO_4$ and leaves a raw cake of cadmium sulfide and selenium. The exact composition of this material is not known and while it may contain distinct phases of cadmium sulfide and selenium, it may also contain certain complex anions of sulfur and selenium. The above equation is believed adequate for representing the overall stoichiometry of the reaction. To this composition is added cadmium oxide or an oxidic cadmium compound to form a composition which, after thorough mixing of the components, is calcined to form the desired product.

The above procedure for preparing the CdSSe by precipitating cadmium sulfide and selenium from a medium containing cadmium sulfate, sodium sulfide and selenium with the subsequent addition of CdO or its precurser is only one means of forming the raw cake for calcination. Other soluble cadmium salts such as cadmium chloride, cadmium nitrate and cadmium iodide can be used as the cadmium source. In addition, the selenium and oxidic cadmium compound can be mixed in with the CdS forming reactants and precipitated along with them such as by adding CdO to the reaction media.

Alternatively, reactants can be employed which by metathesis precipitate cadmium sulfide, selenium and the oxidic cadmium compound as illustrated by the following equations:

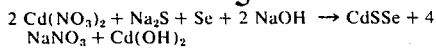

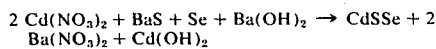

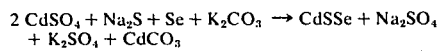

Removal of the soluble products by washing leaves a raw cake containing the necessary ingredients, i.e. cadmium sulfide, selenium and the oxidic cadmium compound. The reactions of other oxidic cadmium compounds such as cadmium oxalate, cadmium formate, cadmium tartrate, etc., are comparable, with the fundamental concept common to all being the co-precipitation of cadmium sulfide and the oxidic cadmium compound in the presence of selenium and calcination of the co-precipitate to bring about the reaction between the three components.

Ideally, the selenium reaction during calcination should be:

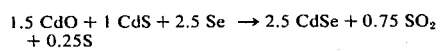

According to the above equation, the amount of CdO necessary to react with all of the selenium but insufficient to provide an excess is 60 mole percent of the selenium present. Accordingly, in commercial pigment producing procedures the amount of the CdO is set at no greater than 60 mole percent of the selenium so as to obtain the maximum selenide formation with a minimum of CdO. As previously mentioned, any excess of CdO remaining after calcination is undesirable when the CdSSe is to be used as a pigment due to its effect on the color of the product.

The present invention is predicated upon the discovery that a cadmium chalcogenide pigment exhibiting improved electrical properties when employed in binder layer electrostatographic photoreceptors is consistently produced by the foregoing general procedure when CdO or oxidic cadmium compound in an amount sufficient to provide an excess of unreacted CdO after calcination is provided. A very small excess of CdO is beneficial in terms of producing a product having improved electrical properties. An excess of up to about 40 percent or more can be employed with an excess in the range of from about 5 percent to about 20 percent being typical. The improved electrical properties are observed by preparing a binder layer photoreceptor containing the cadmium chalcogenide prepared by the process of the instant invention and determining the photo-induced discharge characteristics (PIDC) of the binder layer. To accomplish this, the photoconductive layer is charged to $V_o$ in the dark with negative corona and, at zero time, illuminated with light of 5,750 A, the intensity being $7.35 \times 10^{12}$ photons/cm$^2$/sec. when the cadmium chalcogenide is CdSSe. The wavelength is close to the band edge value for CdS$_{0.6}$Se$_{0.4}$ and corresponds to its maximum sensitivity. The decay of voltage with time is recorded with an oscilloscope. The PIDC are determined by plotting voltage as a function of time. FIG. I is an idealized curve of PIDC for photoconductive materials of high and low sensitivity. The highly sensitive material has a high discharge rate and little or no pseudoresidual (tail) whereas the marginally photoconductive material has a low discharge rate and large pseudoresidual. The pseudoresidual is defined arbitrarily as the fraction of the original voltage remaining on the plate a half second after exposure to the light. The term pseudoresidual is used herein since the layers can be discharged with penetrating light. Dark decay is determined from that portion of the curve to the left of the area covered after the light is turned on.

The photoconductive binder layer (photoreceptor) is prepared by forming a mixture of the photoconductive particles and an insulating organic resin binder. The mixture is dispersed in a suitable liquid carrier and coated onto a substrate whereupon the carrier is allowed to evaporate. At this point, the resin particles are coalesced to form a smooth continuous matrix of the photoconductive particles in the resin binder. The layer can be treated by pressure or contacted with solvent for the resin to coalesce the resin particles. In one embodiment, a thermoplastic resin is used and the matrix is formed by heating the layer to a temperature above the glass transition temperature of the resin. The pigments prepared by the process of the instant invention can be advantageously used in either the classical highly loaded binder layer photoreceptors or in the geometry controlled binder layer previously described. Example I describes a method for the preparation of CdS which exhibits improved photo-induced discharge characteristics. Examples II and III, which follow, illustrate one method of providing excess CdO during calcination of the raw cake to form CdSSe and the use of the so-prepared CdSSe in a highly loaded binder layer photoreceptor.

EXAMPLE I

A cadmium sulphide sample is prepared by reacting CdCO$_3$ with Na$_2$S in aqueous solution. The precipitate is thoroughly washed and calcined at various temperatures to develop crystallinity and yield photosensitive CdS. The initial discharge rate of a binder layer prepared using this material from 600 volts is 350 volts/sec. and the magnitude of the pseudoresidual is 5/6 $V_o$ or 500 volts. The plate is discharged using radiation having a wavelength of 5400 A and an intensity of $8 \times 10^{12}$ photons/cm.$^2$sec.

Finely divided CdCO$_3$ is added to the above-described raw cake prior to calcination. After calcination quantitative analysis of the product indicates that the addition of CdCO$_3$ in excess of 0.75 mole percent of the sulfur results in the presence of unreacted CdO in the sample after calcination. With CdCO$_3$ concentrations above this value, the height of the pseudoresidual decreases as the concentration of the CdO increases. With the addition of 3 mole percent CdCO$_3$, the initial discharge rate is 1100 volts/sec. and the magnitude of pseudoresidual is 1/6 $V_o$ or 100 V. If, in turn, 5 percent of elemental sulfur is added to this material, thereby eliminating the excess CdO, the photo-induced discharge characteristics return to the original conditions, i.e. dv/dt = 350 volts/sec., pseudoresidual = 5/6 $V_o$ or 500 V.

EXAMPLE II

A cadmium sulfoselenide sample is prepared by precipitating cadmium carbonate, cadmium sulfide and selenium from aqueous solution to form a raw cake. This formation is represented by the following equation:

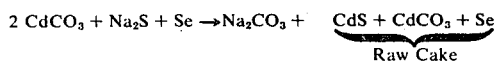

Here again, the exact nature of the precipitated material is not known, but the above equation is believed adequate for representing the overall stoichiometry of the reaction. The mixture of solid products is water washed and dried before being calcined at 450°C. to yield the desired product.

In one experiment, the concentration of $CdCO_3$ in the raw cake is fixed at 60 mole percent of the selenium present, i.e. a sufficient quantity to react all of the Se to CdSSe but insufficient to provide an excess. A second sample is prepared in a similar manner except that the amount of $CdCO_3$ is employed sufficient to provide a 6 percent molar excess of CdO over that required to react with the selenium.

Calcination of the raw cakes provides photoconductive powders which are fabricated into conventional binder layers for xerographic measurement and assessment. This is accomplished by mixing the powder and a polymer, ZAR Polyurethane from United Gilsonite, in a carrier liquid at approximately equal volume concentrations. The solvent is SC150, a chemically inert mixture of aromatic hydrocarbons marketed by Buffalo Chemicals and Solvents. The dispersions are drawn out by a doctor blade using a 5 mil gate onto aluminum plates to provide a layer which is approximately 50 microns thick upon evaporation of the solvent. The layers formed by this process are heated in an oven at 125°C. to complete curing of the polymer and provide binder layers containing 50 percent by volume of the photoconductive pigment.

The PIDC for each plate are determined by the procedure previously described. The xerographic electrical evaluation of the material prepared using a stoichiometric amount of $CdCO_3$ indicates an initial discharge rate from 600 volts to be 480 volts per second with the magnitude of the pseudoresidual being $V_o/2$ or 300 volts. The photoconductive layer prepared using CdSSe made with a 6 percent molar excess of $CdCO_3$ is subjected to an identical electrical evaluation which indicates that the initial discharge rate is increased to 1500 volts per second and the magnitude of the pseudoresidual is reduced to 90 volts. The PIDC of these two layers are graphically set out in FIG. 2. The lower curve is representative of the PIDC of the photoreceptor prepared using excess $CdCO_3$. The curve illustrates the excellent photosensitivity (fast speed) and small pseudoresidual (tail). The upper curve represents the PIDC of the photoconductive layer prepared without excess $CdCO_3$ which has little photosensitivity and a high pseudoresidual.

In the above experiments, all measurements were made on rested layers, i.e. those that had been dark rested for at least one minute before charging and illumination, this being in accord with the practice established for cadmium sulfoselenide layers.

Figure 2:
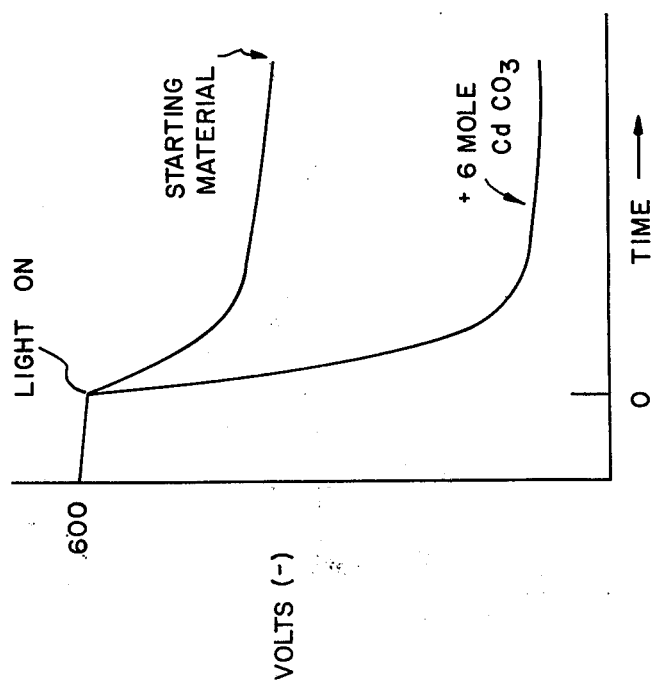
FIG. 2 illustrates the superior performance of the material prepared using excess $CdCO_3$ as opposed to material not containing excess $CdCO_3$.

Comparison of the curves of PIDC in FIG. 2 clearly illustrates the superior performance of the material prepared using excess $CdCO_3$. Comparing FIG. 2 with FIG. 1 points out the similarity between the ideal curve for a photoconductor having high sensitivity and the curve obtained using CdSSe prepared using excess $CdCO_3$. The curve prepared using CdSSe prepared without excess $CdCO_3$ corresponds to the ideal curve for a material having low sensitivity in FIG. 1.

EXAMPLE III

Five photoconductive CdSSe pigments were prepared as previously described by precipitating mixtures of $CdCO_3$, CdS and Se and then reacting the mixtures at an elevated temperature to produce the cadmium sulfoselenide. The mole percent of $CdCO_3$ to selenium was varied in each sample as follows:

$A = 60\%; B = 62\%; C = 63\%; D = 64\%; E = 67\%$

Figure 3:
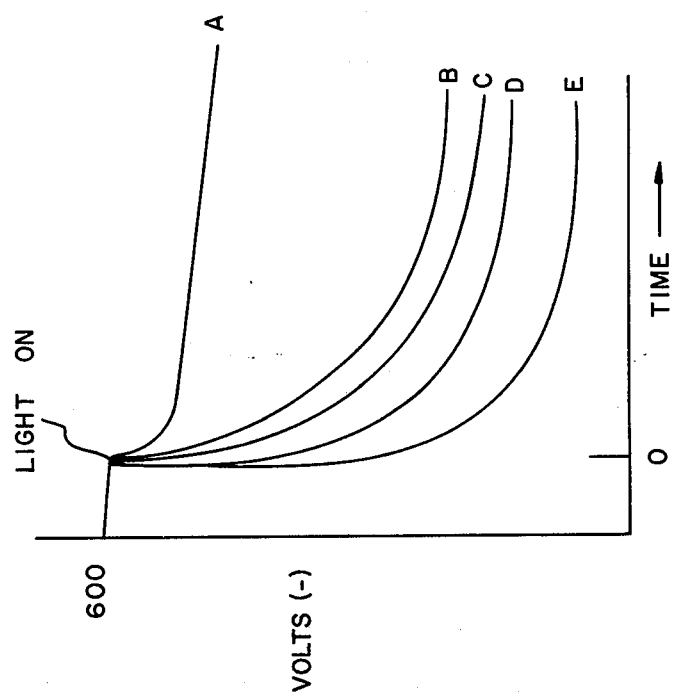
FIG. 3 shows five photoconductive CdSSe pigments in which the mole percent of $CdCO_3$ to selenium was varied.

These CdSSe samples were fabricated into 50 percent binder layers and their xerographic electrical characteristics determined as before. Curves of the PIDC for these five samples are set out in FIG. 3 from which it can be determined that the photo-sensitivity of the material increases as the amount of $CdCO_3$ used in its preparation increases over that amount needed for a stoichiometric reaction.

In the above examples, particle-to-particle contact of the CdSSe is assured by using the material in a high concentration relative to the insulating resin. The photoconductive particles prepared by the process of the instant invention are also useful in the previously described geometry controlled binder layer photoreceptor. The photoconductive particles are fabricated into a geometry controlled binder layer photoreceptor by mixing them with particles of an organic resin and dispersing the particles in a suitable fluid carrier in which neither the resin nor pigment is soluble. Thorough dispersion is necessary to achieve the desired geometric mode in the finished photoreceptor. A continuous film may then be formed by the general technique previously described. The final layer is characterized by the major portion of the photoconductive particles being arranged in the form of continuous paths throughout a substantially continuous matrix of binder material. An important step in the preparation involves the photoconductor geometry control which is achieved by employing a particulate binder material having the correct size and size distribution. The concept may be illustrated by the following generalized example:

A photoconductive binder layer is prepared by forming a particulate mixture of photoconductive particles having a size distribution of from 0.001 to 1.0 micron with a thermoplastic resin binder having a particle size distribution of from 1 to 30 microns. The photoconductive particles are present in a concentration of from 1 to 25, preferably 3 to 15, volume percent. The mixture is dispersed in a suitable liquid carrier by use of a ball mill and the dispersion coated onto a substrate and the carrier liquid allowed to evaporate. The dried layer is then heated to fuse the binder particles into a matrix containing photoconductive particles in the form of continuous paths in particle-to-particle contact throughout the thickness of the binder layer. The size of the resin particles before fusion is normally at least 5 times and preferably at least 10 times that of the photoconductive particles. It should be noted that if the particle size of the pigment particles approaches that of the resin particles, the desired geometry cannot be achieved since the photoconductive particles become completely encased in the resin matrix. When this happens, the desirable results of the system are not achieved.

In the practice of fabricating a practical geometry controlled binder layer photoreceptor, it has been determined that a preferred maximum size for matrix particles is about 10 microns. Use of particles above about 10 microns will result in some image background, although a material having a very wide size distribution is not detrimentally affected by small percentages by number of particles as large as 50 microns or more. The lower size limit is again defined by the size of the photoconductive particles to be employed, but would in turn be from 0.001 to 1.0 microns depending on the magnitude and shape of the size distribution curve.

The resin particles may comprise any electrically insulating organic resin which can be obtained in or made into particulate form, cast into a film or dispersion, and later processed to form a smooth continuous binder layer. Typical resins include polysulfones, polyacrylates, polyethylene, polystyrene, polyphenylene sulfide, epoxy resins, polyesters, poly(vinylchloride), poly(vinylfluoride) and mixtures thereof. Thermoplastic resins are preferred since they can be easily formed or coalesced into the final binder layer by simply heating the particulate layer.

The mixture of resin and photoconductor particles is dispersed in the liquid carrier and applied to a substrate to form a xerographic plate. The substrate is normally of a conductive material such as brass, aluminum, steel or a conductively coated dielectric or insulator. The substrate may be of any convenient thickness, rigid or flexible and in any desired form such as a sheet, web, belt, plate, cylinder or drum. It may also comprise other materials such as aluminum or glass coated with a thin layer of chromium or tin oxide. In some instances, the substrate may be an electrical insulator or dielectric. Typically, the thickness of the binder layer should be between 10 and 80 microns although thinner and thicker layers can be used.

The following example illustrates the use of CdSSe pigments prepared by the process of the instant invention in geometry controlled binder layer photoreceptors. The geometry controlled binder layers are prepared by mixing particulate CdSSe and a particulate random copolymer of styrene and isopropyl methacrylate, at a 10%/90% volume ratio of CdSSe to polymer, in DC-200 oil. The particles are thoroughly mixed by ball milling for at least one hour, cast upon a glass substrate as previously described and heated to fuse the resin. The layers prepared by this method are distinguished from the classical binder layer configuration, where the loading ($\approx 50\%$) is sufficient to guarantee effective particle-to-particle contact. The low loading of photoconductive material of proper size and size distribution combined with thorough mixing provides a layer having a plurality of photoconductive paths through the insulating matrix which configuration escapes from the limits imposed by random geometry and consequent high loading.

EXAMPLE IV

Three separate CdSSe samples are used to prepare 50 $\mu$ thick photoconductive layers having 10 percent photoconductive material by the previously described process. All of the CdSSe samples are prepared in a similar manner except for the ratio of $CdCO_3$ to selenium. Four CdSSe samples are prepared in which $Cd(NO_3)_2$ is the cadmium source and in which the excess $CdCO_3$ employed is 0%, 5%, 9% and 11%, respectively.

Figure 4:
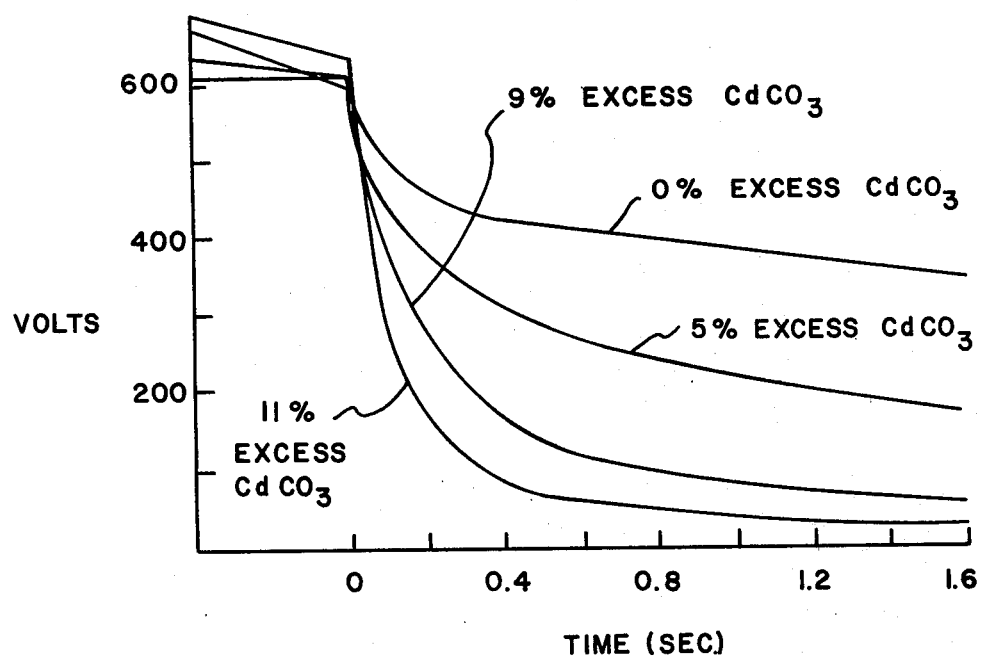
FIG. 4 illustrates the improvement in electrical properties of CdSSe as the ratio of $CdCO_3$ to Se is increased.

The PIDC are determined for each sample and set out graphically in FIG. 4 which clearly illustrates the improvement in electrical properties of CdSSe as the ratio of $CdCO_3$ to Se is increased.

While the invention is not predicated upon any particular theory of operation, it is believed that the improved electrical properties of CdSSe prepared using an excess of CdO are obtained because the presence of excess cadmium oxide during calcination prevents the formation of an appreciable partial pressure of elemental reaction products over the calcining material, an excess of which could result in the formation on the pigment surface of acceptor sites.

What is claimed is:

1. A method for improving the photo-induced discharge characteristics of certain cadmium chalcogenides selected from the group of CdS, CdTe, CdAs, CdSe and CdSSe which comprises calcining a mixture of the cadmium chalcogenide or a precurser thereof in the presence of cadmium oxide or a compound which decomposes upon heating to cadmium oxide in an amount sufficient to provide an excess up to about 40 percent of unreacted cadmium oxide after calcination.

2. The method of claim 1 wherein the cadmium chalcogenide is prepared by combining in aqueous solution a cadmium salt and a soluble salt containing the chalcogenide as anion.

3. The method of claim 2 wherein the cadmium chalcogenide is CdS.

4. The method of claim 3 wherein the CdS is prepared by the reaction of $CdCO_3$ and $Na_2S$.

5. The method of claim 1 wherein the compound which decomposes upon heating to cadmium oxide is cadmium oxalate, cadmium formate, cadmium tartrate or cadmium carbonate.

6. The method of claim 1 wherein the calcination temperature is from 300° to 700°C.

7. The method of claim 6 wherein the temperature is from 450° to 550°C.

8. In the method of preparing cadmium sulfoselenide by calcining a mixture of finely divided cadmium sulfide, cadmium oxide and selenium to form the desired product, the improvement which comprises employing an amount of cadmium oxide or a compound which decomposes upon heating to cadmium oxide sufficient to provide an excess up to about 40 percent of unreacted cadmium oxide after calcination to thereby produce CdSSe exhibiting improved photo-induced discharge characteristics.

9. The method of claim 8 wherein the calcination temperature is from 300° to 700°C.

10. The method of claim 9 wherein the temperature is from 450° to 550°C.

11. The method of claim 8 wherein the compound which decomposes upon heating to cadmium oxide is cadmium oxalate, cadmium formate, cadmium tartrate or cadmium carbonate.

12. A method for improving the photo-induced discharge characteristics of certain cadmium chalcogenides selected from the group of CdS, CdTe, CdAs, CdSe and CdSSe which comprises calcining a mixture of the cadmium chalcogenide or a precurser thereof in the presence of cadmium oxide or a compound which decomposes upon heating to cadmium oxide in an amount sufficient to provide an excess of unreacted cadmium oxide after calcination in an amount of from about 5 to about 20 percent.

13. Finely divided photoconductive cadmium chalcogenides exhibiting improved photo-induced discharge characteristics prepared by the method of claim 1.

14. The cadmium chalcogenides of claim 13 prepared by combining in aqueous solution a cadmium salt and a soluble salt containing the chalcogenide as anion.

15. The product of claim 14 wherein the cadmium chalcogenide is CdS.

16. The product of claim 15 wherein the CdS is prepared by the reaction of $CdCO_3$ and $Na_2S$.

17. The photoconductive cadmium chalcogenides of claim 13 wherein the compound which decomposes upon heating to cadmium oxide is cadmium oxalate, cadmium formate, cadmium tartrate or cadmium carbonate.

18. The photoconductive cadmium chalcogenides of claim 13 wherein the calcination temperature is from 300° to 700°C.

19. The photoconductive cadmium chalcogenide of claim 18 wherein the temperature is from 450° to 550°C.

* * * * *